(12) United States Patent
Schuller et al.

(10) Patent No.: US 8,997,958 B2
(45) Date of Patent: Apr. 7, 2015

(54) HYDRAULIC CIRCUIT, METHOD FOR OPERATING THE SAME

(75) Inventors: Dietmar Schuller, Altmannstein (DE); Hans-Peter Fleischmann, Stammham (DE); Stephan Herold, Kösching (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/115,761

(22) PCT Filed: Apr. 27, 2012

(86) PCT No.: PCT/EP2012/001811
§ 371 (c)(1),
(2), (4) Date: Dec. 17, 2013

(87) PCT Pub. No.: WO2012/152386
PCT Pub. Date: Nov. 15, 2012

(65) Prior Publication Data
US 2014/0291101 A1 Oct. 2, 2014

(30) Foreign Application Priority Data
May 6, 2011 (DE) .......................... 10 2011 100 836

(51) Int. Cl.
| | | |
|---|---|---|
| *F16D 25/12* | (2006.01) | |
| *F16D 48/02* | (2006.01) | |
| *F16H 61/688* | (2006.01) | |
| *F16H 61/02* | (2006.01) | |
| *F16H 57/04* | (2010.01) | |

(52) U.S. Cl.
CPC .............. *F16D 25/14* (2013.01); *F16H 61/688* (2013.01); *F16H 61/0206* (2013.01); *F16H 57/0473* (2013.01)

(58) Field of Classification Search
CPC .............................................. F16D 2300/0214
See application file for complete search history.

(56) References Cited

U.S. PATENT DOCUMENTS

| | | | |
|---|---|---|---|
| 6,631,651 B2 | 10/2003 | Petrzik | |
| 6,761,600 B2 * | 7/2004 | Daus et al. | ............... 192/48.601 |
| 7,401,689 B2 | 7/2008 | Hegerath et al. | |
| 2002/0002878 A1 | 1/2002 | Petrzik | |

FOREIGN PATENT DOCUMENTS

| | | |
|---|---|---|
| CN | 101925762 | 12/2010 |
| CN | 201723692 | 1/2011 |
| CN | 201723693 | 1/2011 |

(Continued)

OTHER PUBLICATIONS

International Search Report issued by the European Patent Office in International Application PCT/EP2012/001811, Aug. 17, 2012.

*Primary Examiner* — Rodney H Bonck
(74) *Attorney, Agent, or Firm* — Henry M. Feiereisen LLC.

(57) ABSTRACT

A dual clutch transmission, in particular of a motor vehicle, includes a hydraulic circuit for cooling the dual clutch transmission, wherein the hydraulic circuit includes at least one pump for conveying a hydraulic medium flow, at least one cooler for cooling the hydraulic medium flow, and a volume control valve for adjusting the hydraulic medium flow for at least one cooling system associated with clutches of the dual clutch transmission. The volume control valve is designed to convey the hydraulic medium flow in a first switching state to a first cooling system associated with a first of the clutches, and in at least one second switching state to a second cooling system associated with a second of the clutches.

11 Claims, 2 Drawing Sheets

(56) References Cited

FOREIGN PATENT DOCUMENTS

| DE | 100 20 187 A1 | 10/2001 |
| DE | 103 47 203 A1 | 6/2004 |
| DE | 10 2010 032 657 A1 | 2/2011 |
| EP | 1 486 693 A1 | 12/2004 |
| EP | 1 614 920 A1 * | 7/2005 |
| EP | 1 637 756 A1 | 3/2006 |
| WO | PCT/US2009/034998 | 2/2009 |
| WO | WO 2009/111220 | 9/2009 |
| WO | PCT/US2009/066674 | 12/2009 |

* cited by examiner

HYDRAULIC CIRCUIT, METHOD FOR OPERATING THE SAME

CROSS-REFERENCES TO RELATED APPLICATIONS

This application is the U.S. National Stage of International Application No. PCT/EP2012/001811, filed Apr. 27, 2012, which designated the United States and has been published as International Publication No. WO 2012/152386 and which claims the priority of German Patent Application, Serial No. 10 2011 100 836.9, filed May 6, 2011, pursuant to 35 U.S.C. 119(a)-(d).

BACKGROUND OF THE INVENTION

The invention relates to a dual clutch transmission, in particular of a motor vehicle, with a hydraulic circuit for cooling the dual clutch transmission, having at least one pump for conveying a hydraulic medium flow, at least one cooler for cooling the hydraulic medium flow, and a volume control valve for adjusting the hydraulic medium flow for at least one cooling system associated with the clutches of the dual clutch transmission.

The invention further relates to a method for operating a dual clutch transmission, in particular as described above, with a hydraulic circuit for the cooling of the dual clutch transmission, wherein a hydraulic medium flow is conveyed with a pump and cooled by a cooler, and wherein the hydraulic medium flow for at least one cooling system associated the dual clutch transmission is adjusted by a volume control valve.

Dual clutch transmissions are preferably used in passenger cars. A dual clutch transmission generally has two coaxially disposed transmission input shafts, wherein each is associated with a corresponding sub-transmission. A clutch is associated with each of the transmission input shafts, with which the transmission input shaft of the respective sub-transmission can be frictionally coupled to the output of an engine, preferably an internal combustion engine of a motor vehicle.

Typically, one of the sub-transmissions is active while driving, which means that the transmission input shaft associated with this sub-transmission is coupled to the engine via its associated clutch. A gear providing a current gear ratio is engaged in the active sub-transmission. A controller determines whether the next higher or next lower gear is to be engaged depending on the driving situation. This gear which will probably be used next is selected in the second, inactive sub-transmission. When changing gears, the clutch of the inactive sub-transmission is engaged, while the clutch of the active portion is disengaged. Preferably, opening of the clutch of the active sub-transmission and closing of the clutch of the inactive sub-transmission overlap so that the flow of force from the engine to the drive shaft of the motor vehicle is not at all or only briefly interrupted. As a result of the gear change, the previously active sub-transmission becomes inactive, while the previously inactive sub-transmission becomes the active sub-transmission. Thereafter, the gear expected to be used next can be engaged in the now inactive sub-transmission. The operation of a dual clutch transmission is otherwise known and will therefore be discussed here in detail.

Usually, the cooling systems of the clutches are served by a fixed displacement pump driven by an internal combustion motor. At least one control or regulating valve is used for adequate cooling of the clutch. The accuracy of the volume flow used for cooling the clutch depends strongly on the employed control or regulating valve. Typically, the hydraulic medium conveyed by the pump is cooled by a cooler and subsequently supplied to the cooling system associated with the clutches, so that only a single cooling medium volume flow is provided for the two clutches. The common cooling system for the clutches thereby worsens the control performance of the clutches.

SUMMARY OF THE INVENTION

It is thus the object of the invention to provide a dual clutch transmission, and a method for operating a dual clutch transmission, which improves in a simple and inexpensive way the control quality of the clutches or cooling of the clutches.

The object underlying the invention is attained in that the volume control valve conveys in at least one first switching state the hydraulic medium flow to a first cooling system associated with one of the first clutches and conveys the hydraulic medium flow in at least one second switching state to a second cooling system associated with one of the second clutches. According to the invention, the hydraulic circuit therefore includes a cooling system for each one of the clutches, wherein the volume control valve supplies in the first switching state hydraulic medium to the first cooling system, and in the second switching state to the second cooling system. In the context of the subject matter of the invention, the volume control valve can also be understood as a volume control or a volume-regulating valve. Each affected clutch of the dual clutch transmission can then be readily cooled as needed. The volume control valve provides two separate hydraulic medium flows for the first and the second cooling system. This improves cooling of the clutches and optimizes the control performance of the clutches.

Advantageously, the volume control valve is designed as a 3/3-way valve and has for this purpose three ports, one of which is associated with the pressure side of the pump while the two other ports of the input side are each associated with a respective one of the cooling systems. In the first switching state, the pressure side of the pump is connected to the first cooling system while the second cooling system connected preferably blind. In the second switching state, the pressure side of the pump is connected to the second cooling system while the first cooling system is preferably connected blind. In the remaining third switching state, the fluid connection between the pump and the two cooling systems is completely interrupted. Advantageously, the 3/3-way valve is designed as 3/3-way valve so that the respective hydraulic medium flow can be varied. More preferably, the volume control valve is configured as a 4/3-way valve, in particular as a 4/3-way proportional valve. This differs from the previously described 3/3-way (proportional) valve in that an additional port is provided which is connected to a return conduit to the tank that supplies the hydraulic medium. In the third switching state, where the fluid connection to the cooling system is interrupted, the latter ports are fluidly connected to each other, so that hydraulic medium coming from the pump is returned to the tank through the conduit. This prevents, for example, backpressure from acting on the pressure side of the pump. According to a preferred embodiment of the invention, in the first switching state, the pressure side of the pump is connected with the first cooling system while the second cooling system while the conduit leading to the tank-carrying is preferably connected blind, in the second switching state, the pressure side of the pump is connected to the tank or to the return conduit leading back to the tank while the first and second cooling systems are preferably connected blind, and in the third switching state, the pressure side of the pump is connected to the second cooling system while the first cooling system and the return conduit leading to tank are connected blind. By interchanging the switching positions in this way, no hydraulic medium flows to the other clutch when the volume control valve is operated in pulsed mode for setting a desired hydraulic medium flow for only one of the clutches. Instead, the volume flow not conveyed to the corresponding clutch is supplied to the tank. Alternatively, the volume control valve is constructed as a 312-way valve, in particular 3/2-way proportional valve, in which case a 3/2-way switching valve is preferably connected upstream of the volume control valve, which preferably connects in a first switching state the pressure side of the pump to the port of the volume control valve associated with the pressure side of the pump, and connects in a second state the pressure side of the pump to the return conduit leading to the tank.

Preferably, the volume control valve is controllable by an electric motor and/or electromagnetically. For this purpose, an electric-motor-driven actuator and/or an electromagnetic actuator is advantageously associated with the volume control valve. The volume control valve can thus be brought quickly and accurately into the desired switching state. In an alternative embodiment, a pilot valve which controls the volume control valve is associated with the volume control valve.

Preferably, the pump is operatively connected or operatively connectable to a drive by an actuatable separating element. Advantageously, the drive shaft of the pump is operatively connected or connectable to an output shaft of the drive by the separating element. The separating element is preferably a clutch or an overrun clutch. The pump can be turned off by actuating the clutch or by changing the direction of rotation in order to interrupt conveyance of the hydraulic medium. When the clutches or the hydraulic medium in the hydraulic tank are cool enough, further cooling and associated energy losses can thus be readily prevented.

Preferably, the drive is constructed as an electric motor, in particular a speed-controlled electric motor. The rotation speed is advantageously selected depending on the operating state of the clutches. Very small volume flows can be controlled accurately at low rotation speeds and large volume flows at high rotation speeds.

The inventive method is characterized in that, depending on the operating state of the dual clutch transmission, in particular the clutches, the hydraulic medium flow can be conveyed to a first cooling system associated with a first of the clutches or to a second cooling system associated with a second of the clutches. This produces the advantages already mentioned above. The temperature of the two clutches is preferably determined as the operating state and advantageously compared with one or more predetermined threshold values. When the temperature of the first clutch exceeds, for example, a critical threshold value, the hydraulic medium flow is supplied to the first clutch so as to reduce its temperature. A similar procedure applies to the second clutch.

When both clutches reach a critical temperature, the volume control valve is controlled in a pulsed mode for substantially simultaneously or quasi-simultaneously conveying the hydraulic medium flow to both clutches, so that the volume control valve advantageously switches between the first and second switching states with a predetermined frequency in order to supply cooled hydraulic medium to both clutches. Preferably, the residence time in each state is adjusted to the cooling requirements of the respective associated clutch. When the temperature of the first or the second clutch drops below a critical value, the hydraulic medium flow is preferably interrupted or cooling of the respective clutch is stopped. This prevents the temperature of the respective clutch from dropping further to an unfavorable range. Instead of a pulsed control, a volume control valve designed as a proportional valve is preferably provided or controlled.

Preferably, the rotation speed of the pump is adjusted as a function of a desired cooling power, whereby the rotation speed is advantageously increased for a high cooling power and reduced for a low cooling power.

This produces an overall high energy efficiency. In addition, minimizing the effects due to cooling of the clutch improve the clutch control performance. In a particularly preferred embodiment, the aforedescribed hydraulic circuit is configured as a hydraulic sub-circuit of a hydraulic circuit for cooling and operating a dual clutch transmission.

BRIEF DESCRIPTION OF THE DRAWING

The hydraulic circuit of the invention will now be described in more detail with reference to the drawing, which shows in.

DETAILED DESCRIPTION OF PREFERRED EMBODIMENTS

Figure 1:
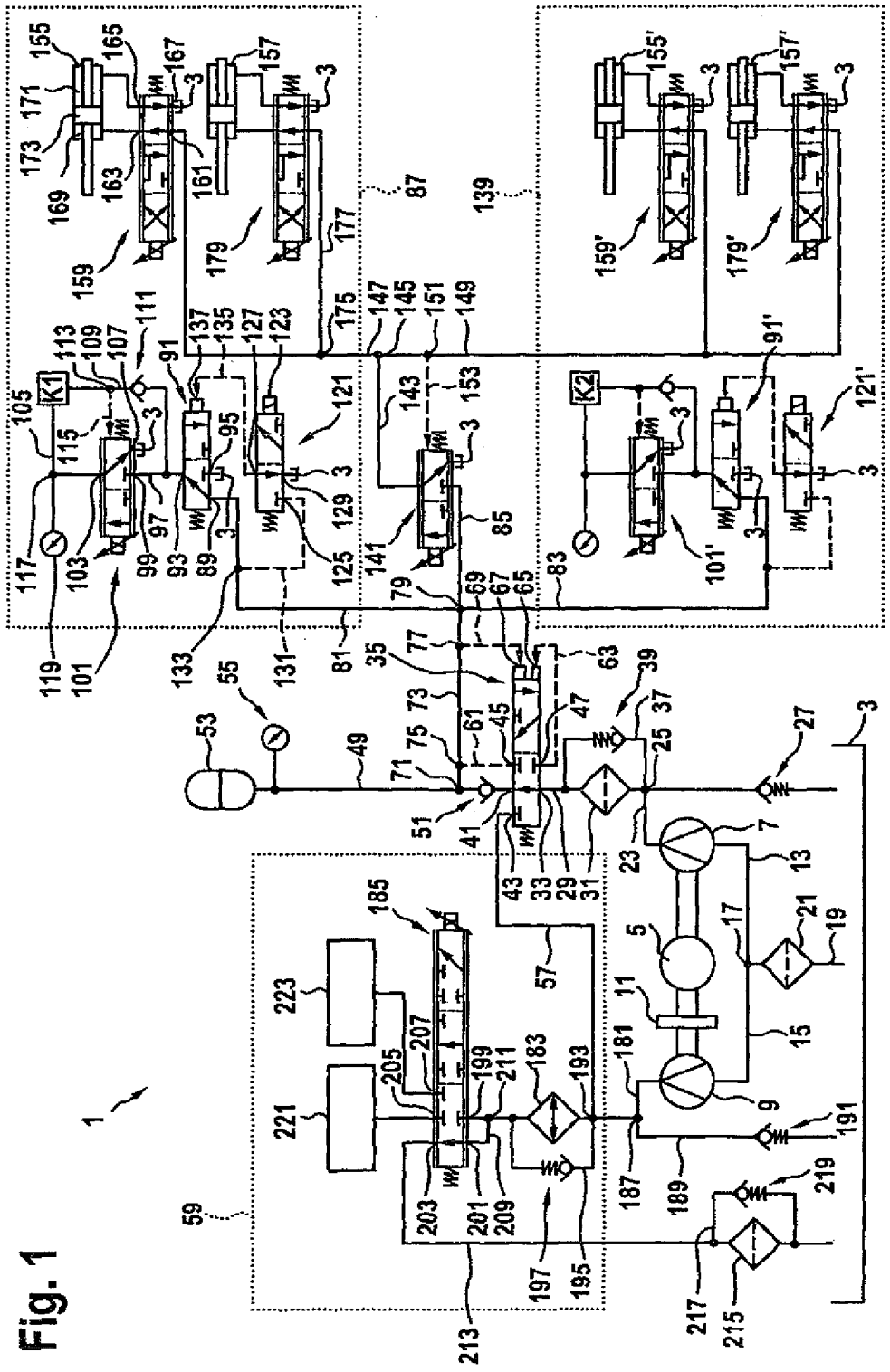
FIG. 1 a first schematic exemplary embodiment of a hydraulic circuit.

FIG. 1 shows a hydraulic circuit 1 which is used to actuate, and in particular to couple and to engage and disengage gears of a dual clutch transmission and to cool the transmission. The hydraulic circuit 1 includes a tank 3, serving in particular as a reservoir or sump for a hydraulic medium used for operation and cooling, in which the hydraulic medium is preferably stored without pressure. An electric motor 5 driving a first pump 7 and a second pump 9 is provided. Preferably, the rotation speed and direction of rotation of the electric motor 5 can be controlled, preferably regulated. The first pump 7 is fixedly connected to the electric motor 5, i.e. without a separating element. In other words, the pump 7 is always driven when the electric motor 5 is running and the hydraulic medium is preferably conveyed in the same direction in the both directions of rotation. The pump 9 is preferably connected to the electric motor 5 by way of a separating element 11. Accordingly, the pump 9 can be decoupled from the electric motor 5, so that the pump 9 is not running when the electric motor 5 is running. The separating element 11 is preferably formed as a clutch or an overrunning clutch, wherein in the second situation the direction of rotation of the electric motor 5 determines whether or not hydraulic medium is conveyed by the pump 9.

The first pump 7 and the second pump 9 are each connected via a corresponding conduit 13, 15 to a junction 17 into which an additional conduit 19 opens. This additional conduit 19 connects the tank 3 to the junction 17 through a suction filter 21. Overall, inlets of the pump 7, 9 are thus connected to the tank 3 via the conduits 13, 15, the junction 17 and the conduit 19 having the suction filter 21.

The outlet of the first pump 7 is connected to a conduit 23 which leads to a junction 25. The junction 25 is connected to the tank 3 via a pressure relief valve 27. The pressure relief valve 27 can open under overpressure in the direction of the tank 3. Furthermore, a conduit 29, which leads via a pressure filter 31 to a port 33 of a switching valve 35, originates from the junction 25.

The pressure filter 31 may be bypassed by a bypass 37, wherein a differential pressure valve 39 is arranged in the bypass 37, which allows bypassing the filter 31 in the direction of the port 33 under overpressure. The differential pressure valve 39 opens starting at a preset differential pressure across the pressure filter 31.

The switching valve 35 is embodied as a 5/2-way valve, which has four additional ports 41, 43, 45, 47 in addition to the port 33. In a first switching state of the switching valve 35 shown in FIG. 1, the port 33 is connected to the port 41, whereas the other ports 43, 45 and 47 are connected blind, i.e. they are closed. The port 41 opens into a conduit 49 in which a check valve is disposed 51. The conduit 49 leads to a pressure accumulator 53, wherein a pressure sensing device 55 is hydraulically connected to the conduit 49 upstream of the pressure accumulator 53.

In a second switching state of the switching valve 35 illustrated in FIG. 1, the port 33 is connected to the port 43 which opens into a conduit 57 that leads to a hydraulic sub-circuit 59 which is used, in particular, to cool the clutches of the dual clutch transmission. In this second switching state, the port 41 is connected blind, while the port 45 is connected to the port 47. In this case, a conduit 61 opens into the port 45 which is subjected to the pressure of the hydraulic medium in the pressure accumulator 53. The port 47 opens into a conduit 63 which is hydraulically connected to a first valve face 65 of the switching valve 35. A second valve face 67 of the switching valve 35 is permanently subjected to the pressure of the pressure accumulator 53 via a conduit 69.

A conduit 73 branches off from the conduit 49 at a junction 71, from which the conduit 61 branches off at a junction 75, and the conduit 69 branches off at a junction 77. The junction 71 is connected to the check valve 51 on the side facing away from the switching valve 35.

The conduit 73 opens into a junction 79, from which the conduits 81, 83 and 85 originate.

The conduit 81 supplies a first sub-transmission in a sub-transmission circuit 87. The first sub-transmission has a clutch K1. The conduit 81 opens into a port 89 of a switching valve 91 which is constructed as a 3/2-way valve and serves as a safety valve for the clutch K1. In a first illustrated switching state of the switching valve 91, the port 89 is hydraulically connected to a port 93, while a port 95 of the switching valve 91 is switched blind. In a second switching state of the switching valve 91 which can be inferred from FIG. 1, the port 93 is connected to the port 95 and via the latter to the tank 3, while the port 89 is connected blind. As will become apparent below, the clutch K1 is switched unpressurized in this second switching state.

The port 93 is connected to a conduit 97 and via the latter to a port 99 of a pressure control valve 101. The pressure control valve 101 is designed as 3/2-way proportional valve having a port 103 which is connected via a conduit 105 to the clutch K1. The pressure control valve 101 additionally has on port 107 that is connected to the tank 3. In a first extreme state of the pressure control valve 101 the port 99 is connected to the port 103, while the port 107 is connected blind. The full pressure prevailing in the conduit 97 of the hydraulic medium is then applied to the clutch K1. In a second extreme state, the port 103 is connected to the port 107 so that the clutch K1 is not pressurized. The pressure control valve 101 regulates the pressure prevailing in the clutch K1 in a conventional manner through proportional variation between these extreme states. A conduit 109 leads from the clutch K1 via a check valve 111 back to the conduit 97. If the pressure in the clutch K1 rises due to the pressure in the conduit 97, the check valve 111 opens, thereby opening a hydraulic connection between the clutch K1 to the conduit 97 via the conduit 109. A conduit 115 branches off from the conduit 109 at a junction 113 which returns the pressure in the clutch K1 as a control variable to the pressure control valve 101.

The conduit 105 includes a junction 117 for hydraulically operatively connecting a pressure detecting device 119. The pressure prevailing in the clutch K1 is thereby detected by the pressure detecting device 119.

The switching valve 91 is controlled by a pilot valve 121 which is actuated by an electric actuator 123. It is formed as a 3/2-way valve and includes the ports 125, 127 and 129. The port 125 is connected via a conduit 131 to a junction 133 provided in the conduit 81. The port 127 is connected by a conduit 135 to a valve face 137 of the switching valve 91. In a first illustrated switching state of the pilot valve 121, the port 125 is switched blind while the port 127 is connected to the port 129 and via the latter to the tank 3, whereby the valve face 137 of the switching valve 91 is switched without applied pressure via conduit 135. Preferably, the pilot valve 121 assumes this switching state when no electric control signal is applied to the actuator 123. In a second assumable switching state of the pilot valve 121, the port 125 is connected to the port 127 while the port 129 is connected blind. In this case, the pressure in the conduit 81 operates on the valve face 137 of the switching valve 91 via the junction 133, the conduit 131 and the conduit 135, causing the switching valve 91 to switch against a biasing force into its second switching state where the port 93 is hydraulically connected to the port 95, so that the clutch K1 is unpressurized. Thus, the switching valve 91 can preferably be operated by way of electrical control of the pilot valve 121, so that the clutch K1 is unpressurized and the clutch K1 is hence open.

The conduit 83 originating at the junction 79 is used to supply a clutch K2 of a hydraulic sub-circuit 139 of a second sub-transmission. Control of the clutch K2 also includes a switching valve 91', a pilot valve 121', and a pressure control valve 101'. The operation is identical to the operation already described in conjunction with the first clutch K1. Reference is therefore made to the corresponding description of the sub-transmission circuit 87. The hydraulic actuation of the clutch K2 corresponds to that of the clutch K1.

The conduit 85 originating at the junction 79 is connected to a pressure control valve 141, via which the pressure of the hydraulic medium in a conduit 143 can be controlled. The operation of the pressure control valve 141 corresponds preferably to the operation of the pressure control valves 101, 101', thus making a repeating the description unnecessary. The conduit 143 is connected to a junction 145, from which a conduit 147 and a conduit 149 originate. A junction 151 at which a conduit 153 originates is provided in the conduit 149, via which the pressure prevailing in the conduit 149 and thus also in the conduit 143 is returned to the pressure control valve 141 as a control variable. It is apparent that the junction 151 may also be provided in the conduits 151 or 147.

The conduit 147 is used to supply gear actuator cylinders 155 and 157 in the sub-transmission circuit 87, which are constructed as two double-acting cylinders, i.e. synchronizing cylinders.

A volume control valve 159 designed as a 4/3-way proportional valve is provided for hydraulic actuation of the gear actuating cylinder 155. It has four ports 161, 163, 165 and 167. The first port 161 is connected to the conduit 147, the second port 163 is connected to a first chamber 169 of the gear actuating cylinder 155, the third port 165 is connected to a second chamber 171 of the gear actuating cylinder 155 and the fourth port 167 is connected to the tank 3. In a first extreme state of the volume control valve 159, the first port 161 is connected to the second port 163, while the third port 165 is connected to the fourth port 167. The hydraulic medium can then flow from the conduit 147 into the first chamber 169 of the gear actuating cylinder 155, while the second chamber 171 is connected via the ports 165, 167 to the tank 3 unpressurized. A piston 173 of the gear actuating cylinder 155 is then moved in a first direction, for example for disengaging a specific gear of the dual clutch transmission or for engaging another specific gear.

In a second extreme state of the volume control valve 159, both of the port 163 and the port 165 are connected to the port 167, while the port 161 is connected blind. In this way, both chambers 169, 171 of the gear actuating cylinder 155 are connected to the tank 3 and depressurized. The piston 173 of the gear actuating cylinder 155 then remains in its current position due to the absence of forces.

In a third extreme state of the volume control valve 159, the port 161 is connected to the port 165 and the port 163 is connected to the port 167. Hydraulic medium then flows from the conduit 147 into the second chamber 171 of the gear actuating cylinder 155, and the first cylinder chamber 169 is depressurized in relation to the tank 3 via port 163 and the port 167. The hydraulic medium then exerts a force on the piston 173 of the gear actuating cylinder 155 such that the piston 173 is displaced in a second direction opposite to the first direction. In this way, the aforementioned specified other gear can be disengaged, or the aforementioned specified gear can be engaged.

As described above, the volume control valve 159 is designed as a proportional valve. The hydraulic medium flow coming from the conduit 147 is divided into the chambers 169, 171 by varying the valve states between the three extreme states, so that a defined speed for engaging or disengaging a gear can be specified by controlling/regulating the volume flow.

A conduit 177 which opens into a volume control valve 179 used to control the gear actuating cylinder 157 branches off from the conduit 147 at a junction 175. The operation of the hydraulic control of the gear actuating cylinder 157 is then identical to that described in conjunction with the gear actuating cylinder 155, making repeating the description unnecessary.

The conduit 149 is used to supply gear actuating cylinders 155' and 157' of the second sub-transmission in the sub-transmission circuit 139, which are also controlled by volume control valves 159' and 179'. The sub-transmission circuits 87 and 139 for controlling the gear actuating cylinders 155, 155' and 157, 157', respectively, are constructed identically, so reference is made to the preceding description.

The outlet of the pump 9 is connected to a conduit 181 which leads to the hydraulic sub-circuit 59 which is preferably used in particular for cooling the clutches K1, K2. The conduit 181 runs via a cooler 183 to a volume control valve 185. A junction 187 is arranged in the conduit 181 downstream of the outlet of the pump 9 and upstream of the cooler 183, from which a conduit 189 branches off that leads to the tank 3 via a pressure relief valve 191 that opens toward the tank 3. A junction 193 into which the conduit 57 opens is arranged downstream of the junction 187 and upstream of the cooler 193, with the conduit 57 coming from the switching valve 35 and being connected to its port 43. The hydraulic sub-circuit 59 can be supplied via the conduit 57 with hydraulic medium conveyed by the pump 7, when the switching valve 35 is in its second switching state. Furthermore, a bypass 195 branches off from the junction 193 which has a differential pressure valve 197 and is arranged parallel to the cooler 183. The differential pressure valve 197 opens the bypass in the direction of the volume control valve 185 under overpressure. The cooler 183 can thus be bypassed.

The volume control valve 185 is designed as 4/3-way switching valve having ports 199, 201, 203, 205 and 207. The port 199 is connected to the conduit 181 via the cooler 183 and the differential pressure valve 197, respectively, as is the port 201 which is connected to the conduit 181 via a conduit 209 and a junction 211. The ports 199 and 201 thus form a common port of the flow control valve 185 because they are both connected to the conduit 181 downstream of the cooler 183. Two ports 199, 201 are shown only for sake of clarity; in actuality, only a single port, for example 199 or 201, is provided for the conduit 181 on the volume control valve 185, wherein according to an alternative embodiment, the volume control valve 185 may in fact be formed as 5/3-way switching valve with the two separate ports 199, 201. The port 203 is connected to a conduit 213 which leads via a pressure filter 215 to the tank 3. The pressure filter 215 can be bypassed by a bypass 217 with a differential pressure valve 219 that opens in the direction of the tank 3.

The port 205 of the volume control valve 185 is connected to a cooling system 221 particularly for the first clutch K1. The port 207 is connected to a second cooling system 223 particularly for the second clutch K2.

In the first extreme state the volume control valve 185 illustrated in FIG. 1, the port 201 is connected to the port 203, while the ports 199, 205 and 207 are connected blind. The total hydraulic medium flow flowing in the hydraulic conduit 181 and through the cooler 183, respectively, is then conveyed via the ports 201, 203 to the conduit 213 and thus via the pressure filter 215 to the tank 3.

In a second extreme state, the ports 199 and 205 connected to each other, while the ports 201, 203 and 207 are connected blind. In this state, the entire hydraulic medium flow reaching the volume control valve 185 is supplied to the first cooling system 221.

In a third extreme state of the volume control valve 185, the ports 199 and 207 are connected together. The ports 201, 203 and 205 are connected blind. In this state, the entire hydraulic medium flow flowing in the conduit 181 is therefore supplied to the second cooling system 223.

As already stated, the volume control valve 185 is designed as a proportional valve so that the intermediate states between the described extreme states can be adjusted so that the volume flow to the cooling systems 221, 223 or to the pressure filter 215 can be adjusted. The volume control valve 185 can also be operated in pulsed mode, wherein each of the three extreme states is adopted at least temporarily. The volume flow conveyed to the cooling systems 221, 223 and the pressure filter 215, respectively, and hence to the tank 3 is controlled or regulated in this mode of operation, when averaged over time.

FIG. 1 shows that a hydraulic medium flow of the conduit 57 can be added to the hydraulic medium in the conduit 181 and supplied to the hydraulic sub-circuit 59. Alternatively, only the conduit 57 may supply hydraulic medium. It should also be mentioned that the proportional valves 101, 101', 141, 159, 159', 179, 179', 185 can each be electrically proportionally adjusted in particular against a spring force.

As already stated above, the conduit 57 opens into the hydraulic sub-circuit 59, more precisely into the conduit 181 downstream of the pump 9. According to an alternative unillustrated embodiment, the conduit 57 opens into the conduit 181 preferably downstream of the cooler 183. By conveying the hydraulic medium from the high pressure circuit to the hydraulic sub-circuit 59 according to the alternative embodiment, the total volume flow through the cooler 183 is reduced. With the reduced volume flow, the pressure drop across the cooler 183 is reduced, thereby also reducing the necessary drive power for the pump 7 and/or 9. The energy required for driving the electric motor 5 is reduced by reducing the backpressures. According to another embodiment, the pump 9 can be directly connected to the electric motor 5, i.e. the illustrated clutch 11 can be eliminated when the backpressures or the pressure level are sufficiently reduced, irrespective of how the reduction is achieved.

According to an additional unillustrated embodiment regarding the arrangement of the pressure filter 215, the pressure filter 215 is arranged in the conduit 213 not between the volume control valve 185 and the tank 3, but preferably in the conduit 181, in particular between the cooler 183 and the volume control valve 185. Preferably, the conduit 57 opens into conduit 181 downstream of the pressure filter 215. With this alternative arrangement of the pressure filter 215, which is now in the main flow of the hydraulic medium, the fraction of time during which the hydraulic medium is filtered by the filter pressure 215 is increased. The bypass valve 219 is preferably designed for a minimum backpressure over the volume flow.

Figure 2:
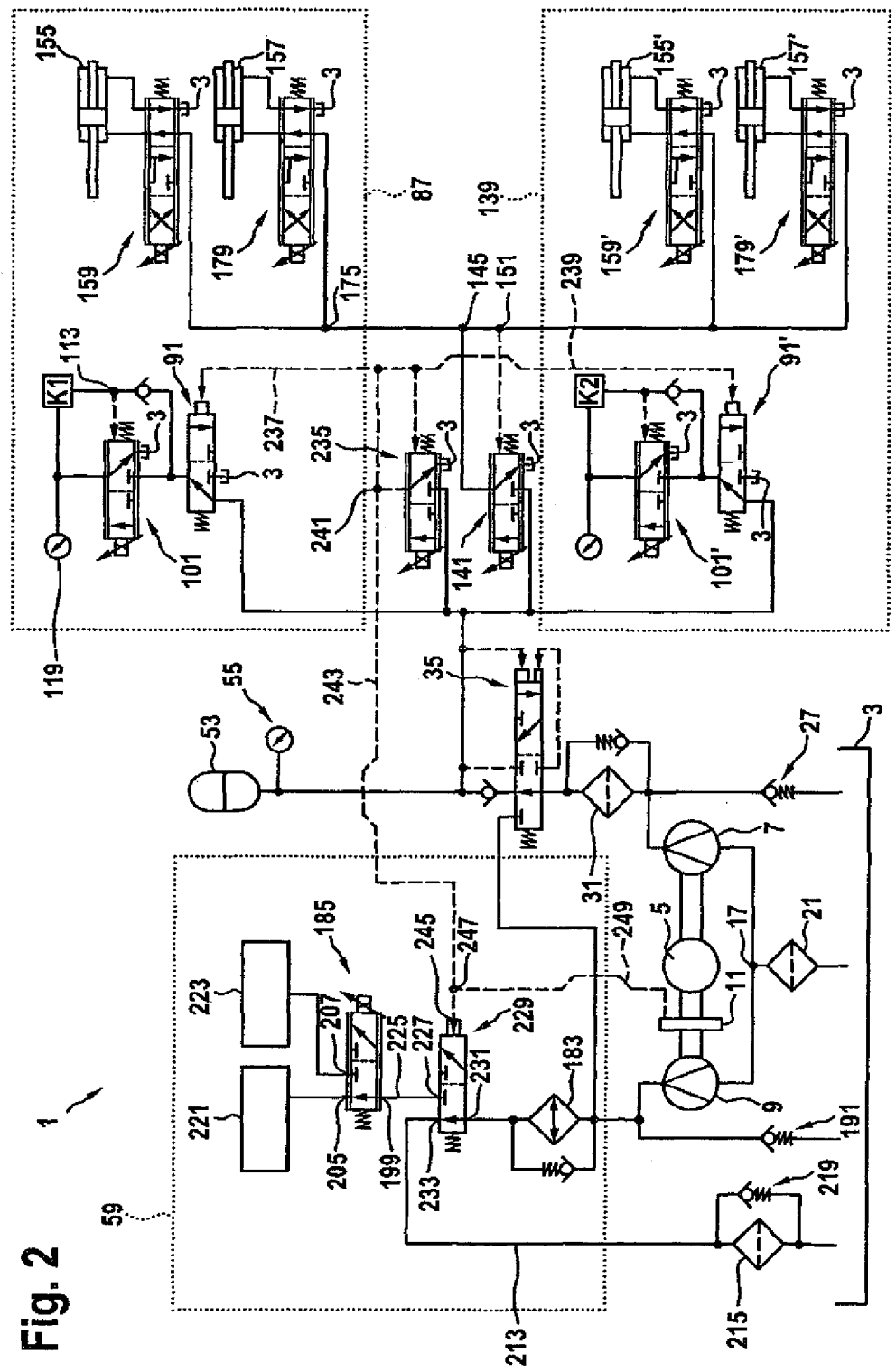
FIG. 2 a second schematic exemplary embodiment of the hydraulic circuit.

According to another embodiment illustrated in FIG. 2 and alternatively to the embodiment of the volume control valve 185 illustrated and described in FIG. 1, the switching position ranges are interchanged such that in the first switching position range the ports 199 and/or 201 are connected to the port 205 or 207, while the other ports of the volume control valve 185 are connected blind, in the second switching position range the connections 201 and/or 199 are connected to the port 3, while the other ports are connected blind, and in the third switching position range the ports 199 and/or 201 are connected to the port 207 or 205, while the remaining ports are connected blind. Interchanging the switching positions prevents, when using pulsed control for the volume control valve 185 for setting a desired hydraulic medium flow for one of the cooling systems 221 and 223, respectively, hydraulic medium from flowing also to the other cooling system 223 or 221. Instead, the volume flow that is not conveyed to the respective cooling system 221 or 223 under pulsed operation is directed into the tank 3. In the actual design of the volume control valve 185 as a 4/3-way proportional valve, the ports 199 and 201 are always to be understood as a common or sole port for the conduit 181 to the volume control valve 185, so that in fact only one of the two ports 199, 201 is provided on the volume control valve 185.

By providing separate cooling systems 221, 223 for the clutches K1 and K2, the clutches K1 and K2 can be individually cooled using the volume control valve 185, thereby improving the control quality of the clutches. In addition, the energy efficiency of the hydraulic circuit is increased, since the clutches K1 and K2 are provided with respective hydraulic cooling medium only as required. The control quality of the volume control valve 185 can be further improved by adjusting the rotation speed of the electric motor 5. Very small volume flows can be accurately controlled at low rotation speeds, whereas large volume flows can be accurately controlled at high rotation speeds.

FIG. 2 shows the hydraulic circuit 1 according to a second embodiment. Elements illustrated in FIG. 1 are provided with the same reference numerals, so that reference is made to the above description. In contrast to the preceding embodiment, the volume control valve 185 is formed as a 3/2-way valve, including only the ports 205, 207 and 199. The port 199 is connected by a conduit 225 to a port 227 of a switching valve 229 constructed as 3/2-way valve. The switching valve 229 has as additional ports a port 231 and a port 233, wherein the port 231 is connected to the conduit 181 downstream of the cooler 183 and the port 233 is connected to the conduit 213.

The switching valve 229 thus conveys in a first-illustrated-switching state the hydraulic medium coming from the cooler 183 via the conduit 213 through the pressure filter 215 to the tank 3. In a second switching state, the switching valve 229 conveys the hydraulic medium to the volume control valve 185, which supplies the cooling systems K1 and K2 as required with hydraulic medium—as described above, according to the second and third extreme state. The second embodiment enables a higher quality of control of the volume flow and greater dynamic range of the volume control. In addition, the backpressure is reduced by the volume flow, thus offering a higher volume throughput and better energy efficiency. The switching valve 229 can be actuated by an electric motor or an electromagnetic actuator or can be configured, as shown, as a pressure-controlled switching valve 229.

Another difference between the second embodiment and the first embodiment is that instead of the two pilot valves 121, 121', a common pilot valve 235 is provided which is connected via conduits 237, 239 to the valve faces 137 of the switching valves 91, 91'. The conduits 237 and 239 are connected via a junction 241 to a port of the pilot valve 235. An additional conduit 243 runs from the junction 241 to a valve face 245 of the switching valve 229, and via a junction 247 and a conduit 249 to the separating element 11. The pilot valve 235 is configured as 3/2-way proportional valve. The switching state of the switching valve 229 can thus be moved to the desired switching state by adjusting the pressure with the pilot valve 235, especially in the conduit 243.

The invention claimed is:

1. A dual clutch transmission comprising clutches and a hydraulic circuit for cooling the dual clutch transmission, wherein the hydraulic circuit comprises:
   a tank providing a hydraulic medium,
   at least one pump for conveying a hydraulic medium flow,
   at least one cooler for cooling the hydraulic medium flow,
   a volume control valve for adjusting the hydraulic medium flow for at least one cooling system associated with the clutches, wherein the volume control valve is constructed as a 4/3-way valve and conveys the hydraulic medium flow in a first switching position to a first cooling system associated with a first of the clutches, conveys the hydraulic medium flow in a second switching position to the tank, and conveys the hydraulic medium flow in a third switching position to a second cooling system associated with a second of the clutches, and
   a drive for the at least one pump adjusting a rotation speed of the pump for conveying the hydraulic medium to the volume control valve as a function of a desired cooling power.

2. The dual clutch transmission of claim 1, wherein the dual clutch transmission is installed in a motor vehicle.

3. The dual clutch transmission of claim 1, wherein the 4/3-way valve is a 4/3-proportional valve.

4. The dual clutch transmission of claim 1, wherein the volume control valve is controlled by an electric motor or electromagnetically, or both.

5. The dual clutch transmission of claim 1, further comprising a separating element operatively connecting the at least one pump to the drive.

6. The dual clutch transmission of claim 5, wherein the separating element comprises an actuatable clutch or an overrunning clutch.

7. The dual clutch transmission of claim 5, wherein the drive is constructed as an electric motor.

8. The dual clutch transmission of claim 7, wherein the electric motor is a speed-controlled electric motor.

9. The dual clutch transmission of claim 1, wherein the volume flow control valve is controlled to adjust the hydraulic medium flow in a pulsed mode.

10. A method for operating a dual clutch transmission with a hydraulic circuit for cooling the dual clutch transmission, comprising:

conveying a hydraulic medium flow with a pump and cooling the hydraulic medium flow with a cooler, and adjusting the hydraulic medium flow for at least one cooling system associated with clutches of the dual clutch transmission with a volume control valve constructed as a 4/3-way valve, depending on an operating state of the dual clutch transmission, conveying the hydraulic medium flow with the volume control valve in at least a first switching position of the volume control valve to a first cooling system associated with a first of the clutches, conveying the hydraulic medium flow in a second switching position of the volume control valve to a tank providing hydraulic medium, and conveying the hydraulic medium flow in a third switching position to a second cooling system associated with a second of the clutches, and adjusting a rotation speed of the pump for conveying the hydraulic medium to the volume control valve as a function of a desired cooling power.

11. The method of claim 10, and further actuating the volume flow control valve in a pulsed mode.

\* \* \* \* \*